United States Patent [19]

Jürges

[11] 4,427,208

[45] Jan. 24, 1984

[54] MUDGUARD

[76] Inventor: Heinz-Henning Jürges, Am Rugen End 13, D - 2150 Buxtehude, Fed. Rep. of Germany

[21] Appl. No.: 364,253

[22] Filed: Apr. 1, 1982

[30] Foreign Application Priority Data

Apr. 8, 1981 [DE] Fed. Rep. of Germany ....... 8110658

[51] Int. Cl.³ .............................................. B62B 9/16
[52] U.S. Cl. .......................... 280/153 R; 280/154.5 R; D12/184
[58] Field of Search ........ 280/153 R, 153 A, 154.5 R; 296/1 S; 428/31; D12/184, 185

[56] References Cited

U.S. PATENT DOCUMENTS 3,341,222  9/1967  Roberts ........................ 280/154.5 R
4,215,873  8/1980  Price ............................... 280/153 R
4,258,929  3/1981  Brandon et al. ............. 280/154.5 R

FOREIGN PATENT DOCUMENTS 1584453  2/1981  Canada ........................ 280/154.5 R
1954752  2/1967  Fed. Rep. of Germany .
1755262  12/1971  Fed. Rep. of Germany .

Primary Examiner—Joseph F. Peters, Jr.
Assistant Examiner—Michael Mar
Attorney, Agent, or Firm—Murray Schaffer

[57] ABSTRACT

The invention concerns a mudguard for heavy-goods motor vehicles. The mudguard has an outer splash protection edge which is radially drawn in. The mudguard is characterized in that the edge (1) has ribs (6) on its side facing the wheel (8). Ribs (6) extend in the peripheral direction of the wheel (8) and their distance from one another and their height, decreases in an outward direction.

5 Claims, 3 Drawing Figures

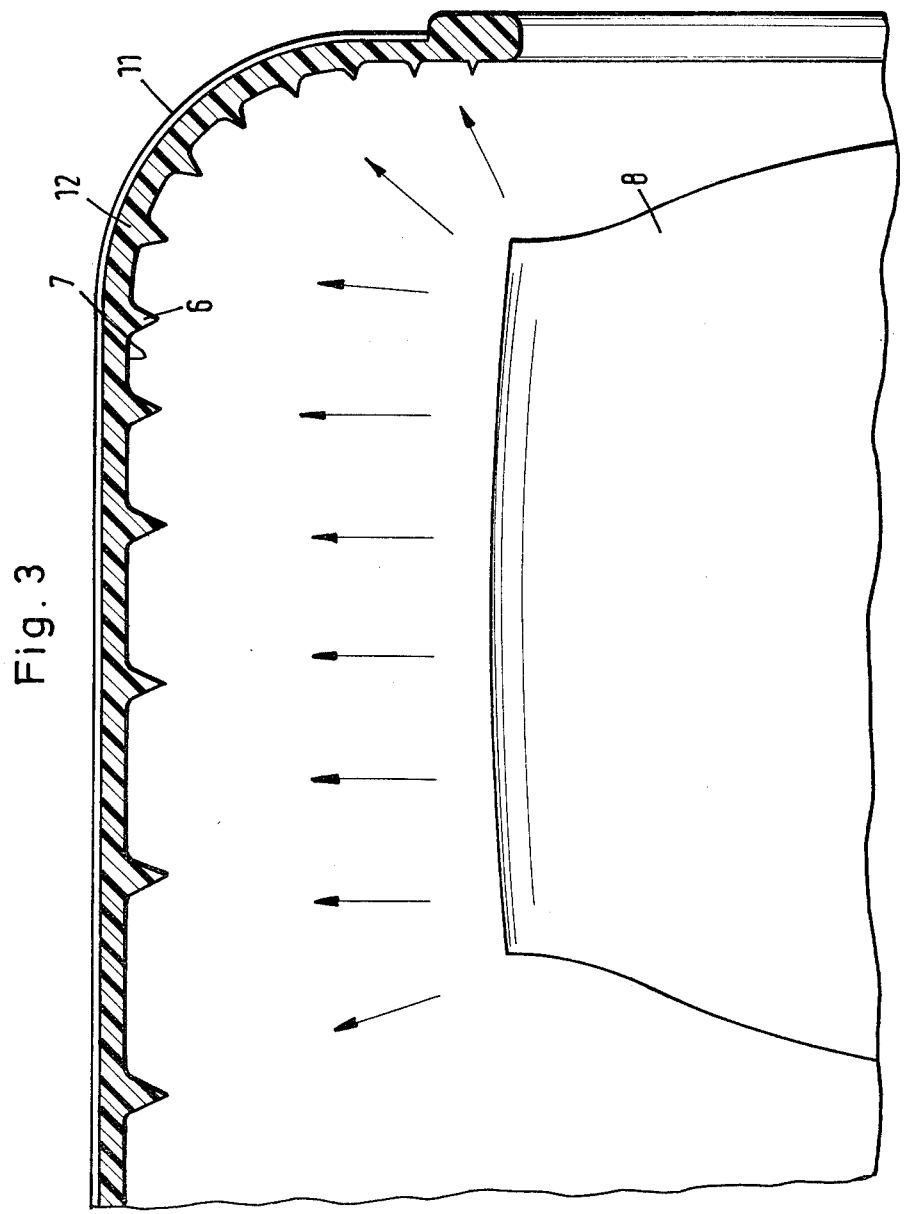

MUDGUARD

FIELD OF THE INVENTION

The innovation relates to a mudguard for motor vehicles, especially heavy-goods vehicles, with an outer splash-protection edge drawn in radially.

STATEMENT OF THE PRIOR ART

A known splash-protection edge of this type (German Utility model 1.954.752) has a smooth inner side and therefore only limited effectiveness as a protective device against water splashing off and spraying off; it serves primarily as an edge termination for a simple cylindrical mudguard plate.

A known water-spray deflector for heavy-goods vehicle consists of plastic mats which have on their sides facing the wheels an approximately 2 cm thick layer of polyethylene bristles. Mats of this type are arranged on the sides of the wheels facing away from the driving direction. A specific proportion of the water picked up by the tires is splashed against the mats, is absorbed there by the bristles and then runs down again from the mats. A serious disadvantage of the bristle surface is that, when the road is covered with snow and dirt, it quickly becomes clogged and is then ineffective.

A known dirt fender (German Offenlegungsschrift No. 1,755,262) consists of a flexible flap which is to be attached to hang behind the vehicle wheel and of which the side facing the wheel is provided with a number of ribs or grooves extending approximately parallel to the peripheral lines of the wheel. Because of its ribbed profile the known dirt fender is self-cleaning; however, it has no effect in suppressing lateral splashes of water.

SUMMARY OF THE INVENTION

In contrast to this, the object on which the present innovation is based is to provide a mudguard with a splash-protection edge which is effective against lateral spraying-off and which guarantees a self-cleaning effect even in snow and slush or when the road is very dirty.

This object is achieved, according to the innovation, due to the fact that the splash-protection edge is provided on its side facing the wheel with ribs extending in the peripheral direction of the wheel, their distance from one another and their height decreasing from the inside outwards.

As a result of the different depths and widths of the grooves formed between the ribs, specifically with a groove size decreasing from the inside outwards, it is possible to achieve the self-cleaning effect over the entire width of the splash-protection edge. At the same time, the groove size is adapted to the droplet size which decreases from the inside outwards.

As a result of the radial extension of the splash-protection edge, the lateral splashes of water are intercepted efficiently. The droplets of water are collected in the grooves formed between the ribs and are conveyed away along the grooves.

A rib cross-section consisting of flanks converging at an acute angle is especially advantageous for the self-cleaning effect and, consequently, for maintaining the splash-protection function of the splash-protection edge according to the invention.

The splash-protection edge according to the innovation can be connected, as a separately produced part, to an essentially cylindrical mudguard portion. In this case, it is appropriate if the edge and the cylindrical portion of the mudguard consist of different materials; advantageously, the cylindrical portion consists of sheet metal and the mudguard edge of rubber. To connect the two parts, a connecting bead of the mudguard edge is inserted into a corresponding recess of the cylindrical mudguard portion and is clamped down there by a bracing wire.

Within the scope of the innovation there is also the possibility of making the cylindrical portion of the mudguard and its splash-protection edge in one piece, preferably of rubber or plastic, in the latter case, for example, of foamed polyurethane, it appropriate with a stiffening fiber insert, or thermoplastic plastic. Finally, it is also possible to use sheet-metal mudguards which are coated on their inner side with the splash-protection profile according to the innovation made of rubber or plastic.

The special rib form proposed according to the innovation ensures that, in the region of the rib profile, the drops thrown off from the tire profile are comminuted and atomised to a lesser extent during their impact; the water droplets collected in the grooves between the ribs can run off there undisturbed, since the groove cavity is protected by the projecting ribs against an air flow running transversely to the driving direction.

Of course, in the region of a heavy-goods vehicle tire, the mudguard of which is equipped with the splash-protection edge according to the innovation, there can also be a splash-protection flap which is arranged on the rear side of the wheel to extend to near the road surface and which has a profile corresponding to the splash-protection edge.

BRIEF DESCRIPTION OF THE DRAWINGS

An exemplary embodiment of the innovation is described below with reference to the drawing in which:

FIG. 3 shows a cross-section through a mudguard with a splash-protection profile.

DETAILED DESCRIPTION OF THE INVENTION

Figure 1:
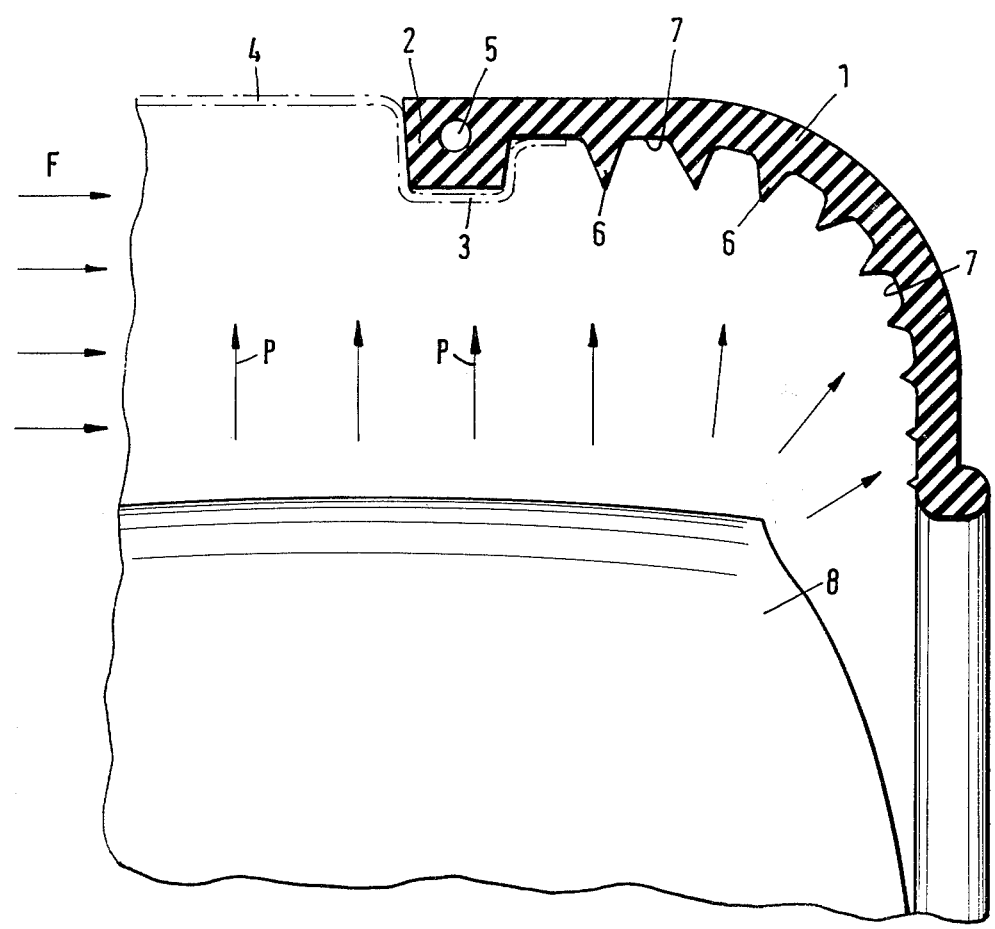
FIG. 1 shows a cross-section through the splash-protection edge.

According to FIG. 1, a splash-protection edge 1 has at its inner end an encircling bead 2 which is received in a recess 3 of a cylindrical mudguard profile 4. Whereas the mudguard profile 4 is appropriately formed from sheet metal, the splash-protection edge 1 preferably consists of rubber. In the region of the bore 5 in the interior of the bead 2, the splash-protection edge is clamped down by means of a bracing wire (not shown) threaded through the bore and is thereby connected firmly to the mudguard 4. On its side facing the wheel, the splash-protection edge 1 has ribs 6 between which grooves 7 are formed. The water thrown off in the direction of the arrows P by the tire profile 8, also indicated by a dot - and - dash line is captured by the inner profile of the splash-protection edge 1 and is conveyed away in the grooves 7 extending in the peripheral direction of the wheel. The feared formation of a spray mist is effectively suppressed as a result. The rib cross-section corresponds to an acute-angled triangle with a slightly rounded apex. The splashes of water are conveyed away into the grooves 7 on the flanks of the ribs without being atomised additionally.

This also applies to particles of water which are sprayed off in the direction of the wheel axle, that is to say approximately according to the arrows F, from any rebound surfaces of the structure of the heavy-goods vehicle. Moreover, the rib profile is adapted to the droplet size. According to the droplet size decreasing from the inside outwards, the cross-section of the ribs 6 and of the grooves 7 respectively also decreases from the inside outwards. As a result, it becomes possible always to keep the rib profile clean even in the outer region, that is to say the small droplets predominating there are sufficient to maintain the necessary self-cleaning effect in the region of the shallower outer grooves.

Figure 2:
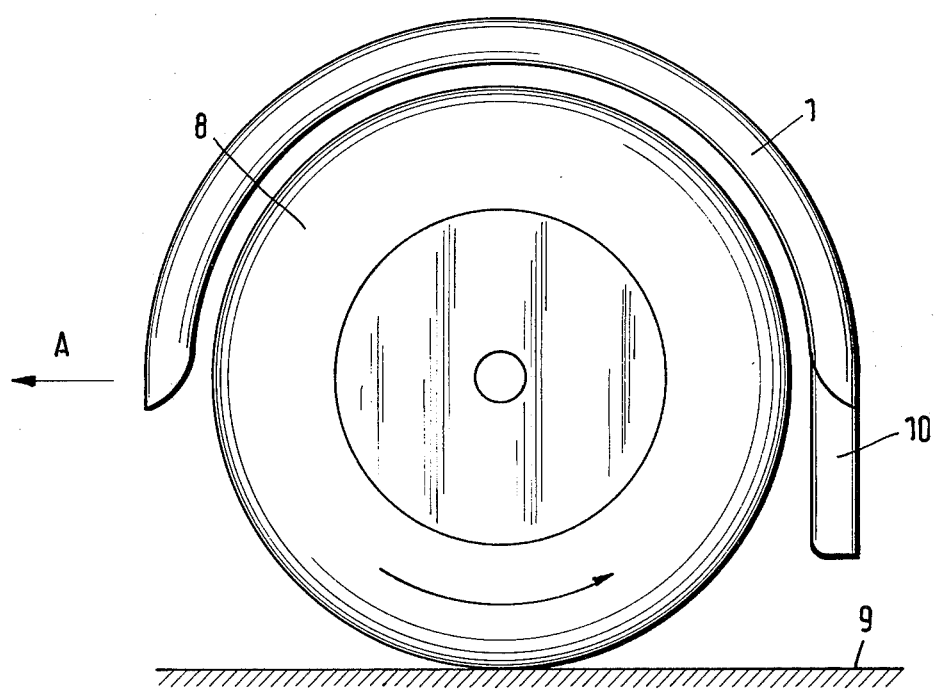
FIG. 2 shows a side view a mudguard with a splash-protection edge.

An especially efficient, albeit somewhat more expensive embodiment of the protective device according to the innovation against the spraying and atomizing of rain water picked up by the tire profile is illustrated in FIG. 2. On the side of the wheel 8 to the rear in relation to the driving direction A, the mudguard has towards the road 9 a prolongationin the form of a splash-protection flap 10 which is made completely of flexible plastic material or rubber and which on the inner side continues the ribbed profile of the mudguard edge 1. As a whole, the prolongation 10 represents a continuation of the mudguard in a direction perpendicular to the road surface. In an alternative form, the prolongation can also be composed of a plane sheet-metal bar to which is connected a straight splash-protection edge with a profile illustrated in FIG. 1. FIG. 3 shows a sheet-metal mudguard, the sheet-metal shell 11 of which is lined on its inner side with a splash-protection profile 12 made of plastic. In this embodiment, the splash-protection profile 12 is extended beyond the edge region of the mudguard over the entire inner surface of the mudguard. If an appropriately rigid plastic material is used, the sheet-metal shell 11 can even be omitted, so that a pure plastic mudguard is obtained.

I claim:

1. A mudguard for motor vehicles, especially heavy goods vehicles, comprising an arched portion adapted to be mounted to the vehicle above the tire thereof and a splash protection edge having in cross-section an arcuate section and a radially drawn in section facing the tire, said splash protection edge having a plurality of ribs on its inner surface facing the tire and extending in the peripheral direction of the tire rotation, the height of each rib and the spacing between successive ribs decreasing outwardly from said vehicle.

2. The mudguard according to claim 1 wherein each of the ribs have two flanks converging at an acute angle.

3. The mudguard according to claim 1 wherein the splash protection edge is removably connected, as a separately produced part, to said arched portion.

4. The mudguard according to any one of claims 1-3 wherein the splash protection edge and the arched portion are formed of different materials.

5. The mudguard according to any one of claims 1-3 wherein said arched portion extends outwardly from said vehicle over the arcuate section of said splash protection edge.

* * * * *